(12) United States Patent
Wu et al.

(10) Patent No.: US 7,267,780 B1
(45) Date of Patent: Sep. 11, 2007

(54) FORMATION OF FACETS ON OPTICAL COMPONENTS

(75) Inventors: Chi Wu, San Marino, CA (US); Wenhua Lin, Pasadena, CA (US)

(73) Assignee: Kotura, Inc., Monterey Park, CA (US)

( * ) Notice: Subject to any disclaimer, the term of this patent is extended or adjusted under 35 U.S.C. 154(b) by 0 days.

(21) Appl. No.: 10/455,865

(22) Filed: Jun. 6, 2003

Related U.S. Application Data

(63) Continuation of application No. 09/785,565, filed on Feb. 16, 2001, now Pat. No. 6,596,185.

(60) Provisional application No. 60/287,555, filed on Nov. 28, 2000.

(51) Int. Cl.
*B29D 11/00* (2006.01)
(52) U.S. Cl. ...................................................... 216/24
(58) Field of Classification Search .................. 216/24; 438/29, 31; 385/123, 124, 125, 126, 127, 385/128, 129, 130, 131, 132
See application file for complete search history.

(56) References Cited

U.S. PATENT DOCUMENTS 6,212,320 B1 * 4/2001 Rickman et al. .............. 385/49
6,231,771 B1 * 5/2001 Drake ......................... 216/24

* cited by examiner

*Primary Examiner*—Parviz Hassanzadeh
*Assistant Examiner*—Roberts Culbert
(74) *Attorney, Agent, or Firm*—Gavrilovich, Dodd & Lindsey, LLP

(57) ABSTRACT

A method of forming an optical component on a substrate structure includes forming a ridge in a light transmitting medium positioned on a base. The ridge includes a waveguide region configured to propagate light signals and a flange region extending across a longitudinal axis of the waveguide region. The method also includes removing at least a portion of the flange region so as to expose a facet aligned with the waveguide region such that light signals propagated along the waveguide region are transmitted through the facet.

16 Claims, 16 Drawing Sheets

FORMATION OF FACETS ON OPTICAL COMPONENTS

RELATED APPLICATIONS

This application is a continuation of U.S. patent application Ser. No. 09/785,565; filed on Feb. 16, 2001 now U.S. Pat. No. 6,596,185 and entitled "Formation of Optical Components on a Substrate" which claims the benefit of U.S. Provisional Application No. 60/287,555; filed on Nov. 28, 2000 and entitled "Method of Fabricating Components on a Substrate." Each of the above patent applications is incorporated herein in its entirety.

This application is also related to U.S. patent application entitled "Formation Of A Vertical Smooth Surface On An Optical Component", Ser. No. 09/690,959, filed on Oct. 16, 2000 and incorporated herein in its entirety.

BACKGROUND

1. Field of the Invention

The invention relates in general to optical components, more particularly, to the arrangement and fabrication of waveguide facets on optical components.

2. Background of the Invention

A variety of electrical and optical components are formed on substrates such as silicon and silica. A typical component manufacturing process involves etching the various parts of the components and interconnects onto the surface of a wafer. Ingots can be grown and several disc-shaped wafers are sliced from the ingot. Due to cost and fabrication time efficiencies, several devices are formed on a single wafer. After several components are formed on a wafer the components are separated.

Conventional methods of separating the components include sawing, mechanically cutting, and using a laser or milling machine. Often the edges of the separated components are further finished by polishing. Conventional methods, however, have several disadvantages. For example, vibrational and thermal and other stresses caused by cutting and polishing fatigue the material and result in less than optimum performance of the components. Often the stresses of the separation process do not affect performance of the component until a period of time has passed and the stress fractures and fissures have propagating from the edge of the substrate to critical components.

Optical components using conventional separation techniques are particularly susceptible to the problems discussed above. Due to the small wavelength of light, the performance of optical components is significantly affected by imperfections such as fractures or fissures. Further, the interfaces of optical components such as facets are often formed by cutting and polishing. In addition to the problems discussed above, the cutting and polishing of an optical interface can result in an interface with poor transmission and reflective characteristics.

Therefore, there is a need for a method for separating components formed on a substrate.

SUMMARY OF THE INVENTION

The invention relates to a method of separating optical components. The method includes obtaining a substrate structure having a plurality of optical components formed on the substrate structure. The method also includes performing a separation etch on a separation region of the substrate structure. The separation region is selected such that separating the substrate structure at the separation region separates at least one of the optical components from the other optical components.

Another embodiment of the method includes obtaining a substrate structure having an optical component formed on the substrate structure. The method also includes performing a separation etch on a separation region of the substrate structure. The separation region is selected such that separating the substrate structure at the separation region trims the substrate structure away from the optical component.

In some instances, the component(s) includes a waveguide and the separation etch is performed so as to form at least a portion of a facet on the waveguide. The separation etch can optionally be performed so the facet is angled at less the ninety degrees relative to a direction of propagation of light signals traveling along the waveguide.

The invention also relates to a substrate structure. The substrate structure includes a plurality of optical components positioned on the substrate structure. A groove is formed on the substrate structure. The groove is positioned such that separating the substrate structure along the groove separates at least one of the optical components from the other optical components.

Another embodiment of the substrate structure includes an optical component positioned on the substrate structure. A groove is formed on the substrate structure. The groove is positioned such that separating the substrate structure along the groove trims the substrate structure away from the optical component.

In some instances, the groove is positioned adjacent to a facet of one or more waveguides positioned on the optical component(s). The facet can optionally be angled at less than ninety degrees relative to a direction of propagation of light signals traveling along the waveguide.

DETAILED DESCRIPTION

Figure 1:
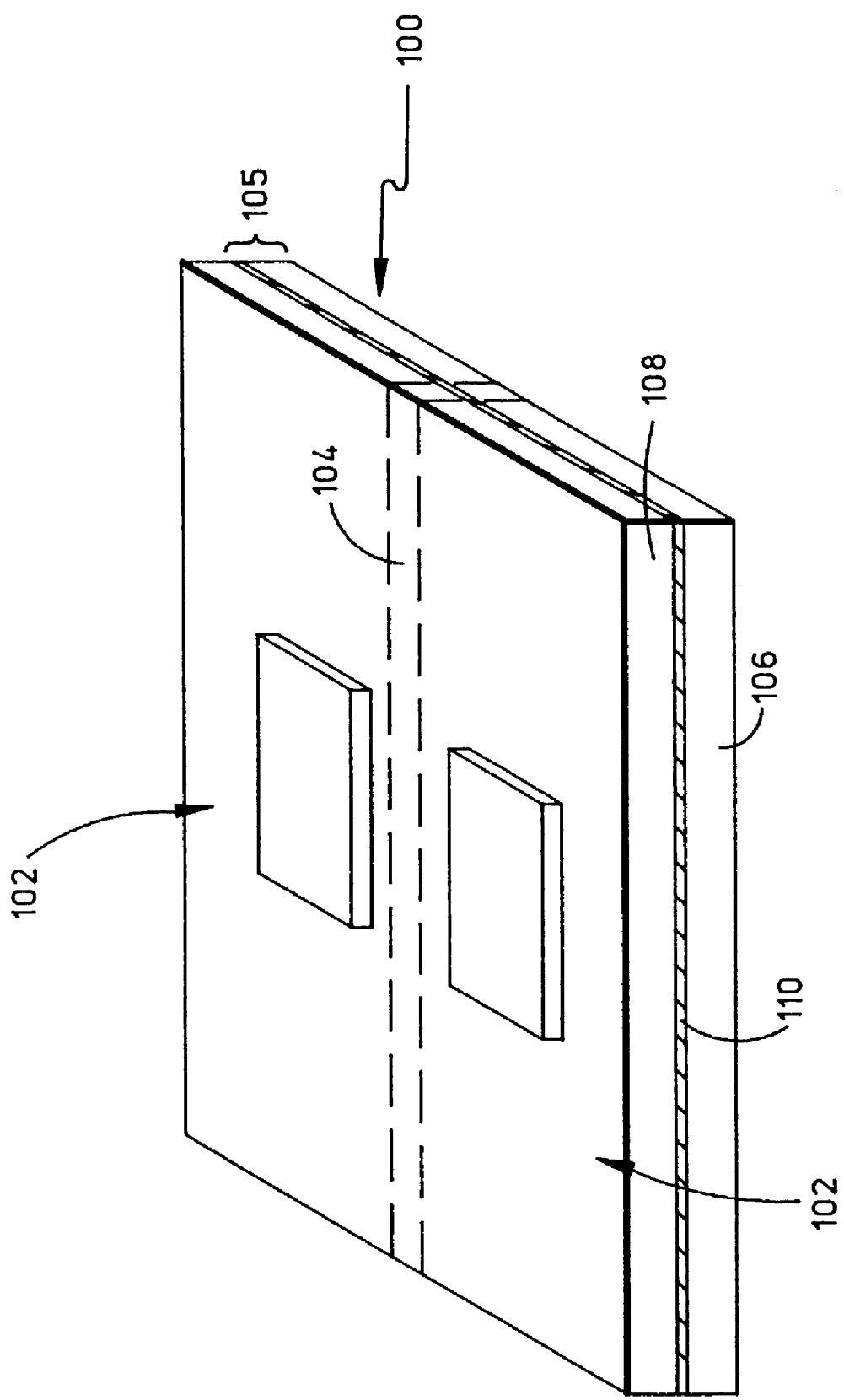
FIG. 1 is a block diagram illustrating a top view of a substrate structure with a plurality of components.

FIG. 1 is block diagram of an isometric view of a substrate structure 100 having a plurality of components 102. The substrate structure 100 includes one or more materials positioned over base 105 that includes a substrate 106 or a wafer. For example, the substrate structure 100 can include a light transmitting medium 108 positioned over a base 105 that includes a light barrier 110 positioned over a substrate 106. A silicon on insulator wafer is an example of a substrate structure 100. The typical silicon on insulator wafer includes a layer of silicon that serves as the light transmitting medium 108, a layer of silica that serves as the light barrier 110 and another layer of silicon that serves as the substrate 106. Other materials and combinations of materials may be used for the substrate structure 100. Examples of suitable materials include Silicon, silica, Silicon dioxide, Gallium Arsenide, InP, LiNbO$_3$, and Polymer materials. Those skilled in the art will other materials that can be used to form components 102 on the substrate 106.

Although the substrate structure 100 illustrated in FIG. 1 includes only two components 102 and has a rectangular shape, those skilled in the art will recognize that the substrate structure 100 can be other shapes such as circular and/or contain more than two components 102.

A separation region 104 of the substrate structure 100 is located between optical components 102. A separation etch is performed on the separation region so as to remove enough of the substrate structure 100 to allow the components 102 be separated. As is explained in further detail below, the separation region 104 of the substrate structure 100 can have a variety of shapes and contours. The separation region 104 of the substrate structure 100, for example, may be curved. Further, the etching process may require etching through one or more layers of materials, the use of different etchants and/or the use of multiple etching steps. A suitable etch for removing the separation region 104 of the substrate structure 100 is a reactive ion etch, an etch according to the Bosch process or an etch in accordance with U.S. patent application entitled "Formation Of A Vertical Smooth Surface On An Optical Component 102", Ser. No. 09/690,959, filed on Oct. 16, 2000 and incorporated herein in its entirety.

Figure 2A:
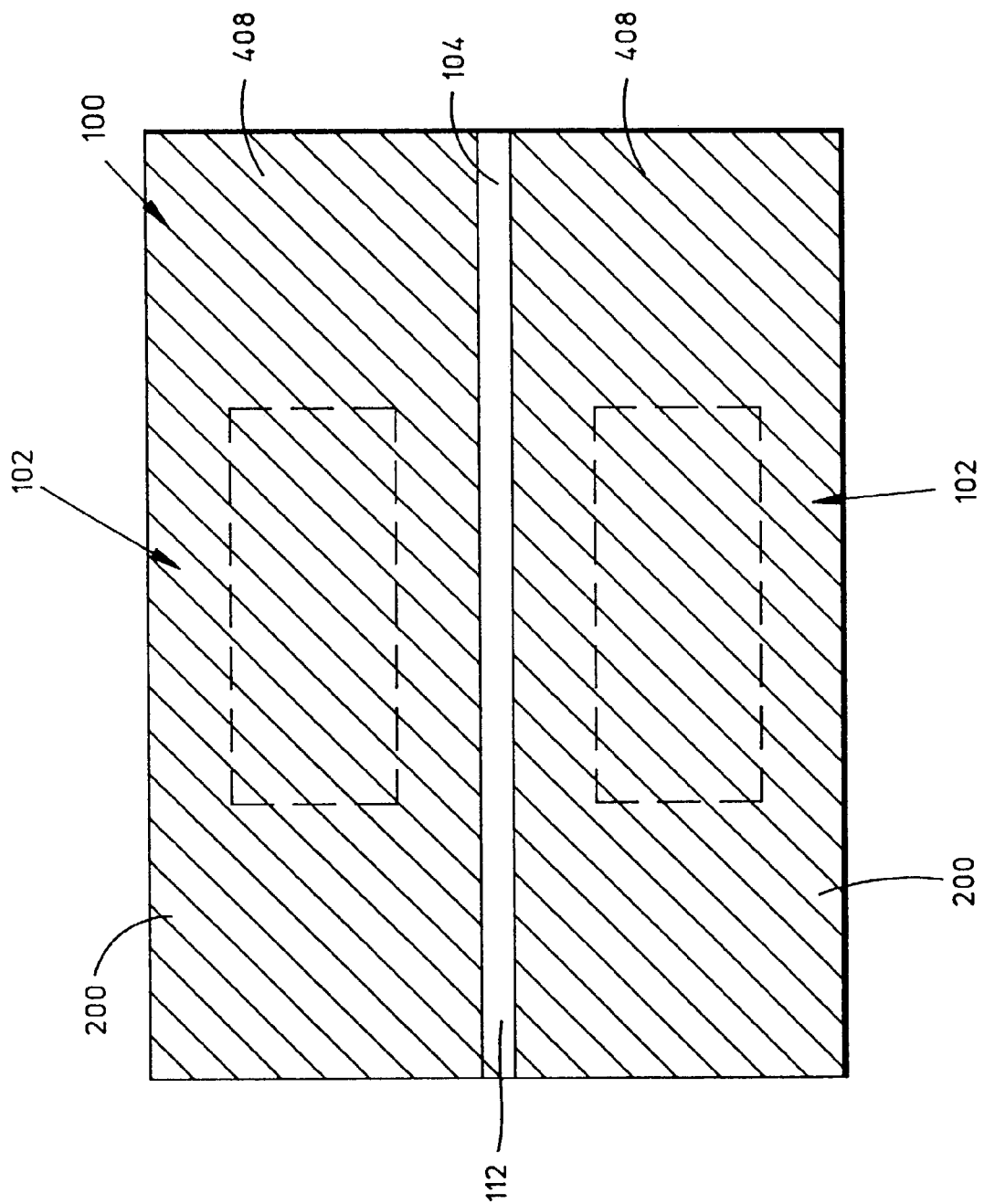
FIG. 2A is a block diagram of the substrate structure after a mask is formed to expose the separation region of the substrate structure.

FIG. 2A is a block diagram of a substrate structure 100 after a mask 200 is formed over the substrate structure 100. The mask is formed so the separation region 104 of the substrate structure 100 remains exposed. A suitable method of forming masks includes, but is not limited to, applying a mask material to the entire surface of the substrate structure 100 including the separation region 104. The mask material is selectively exposed to light of an appropriate wavelength. The light is patterned as the separation region 104. The substrate structure 100 is washed in a solution to remove the areas exposed to the light. The resulting mask 200 leaves the separation region 104 exposed.

Although the separation region 104 is illustrated as being positioned between adjacent components 102, the separation region 104 can also be positioned at an edge of the substrate structure 100. For instance, it may be desirable to separate a single component 102 from a portion of the substrate structure 100 or it may be desirable to trim a portion of the substrate structure 100 away from the component 102.

The separation etch is performed by applying a corrosive substance to the exposed regions of the substrate structure 100. The separation etch removes the separation region 104 of the substrate structure 100 and results in formation of a groove 112 in the substrate structure 100. A variety of corrosive substances (etchants) can be used and applied in different ways. A suitable separation etch includes a reactive ion etch, an etch according to the Bosch process or an etch in accordance with patent application Ser. No. 09/690,959 referenced above. In some instances, the substrate structure 100 is etched so the groove 112 extends through the light transmitting medium 108. In other instances, the groove 112 extends to a depth within the base 105 or within the substrate 106. Alternatively, the separation etch can be performed so the groove 112 extends completely through the substrate structure 100.

Figure 2B:
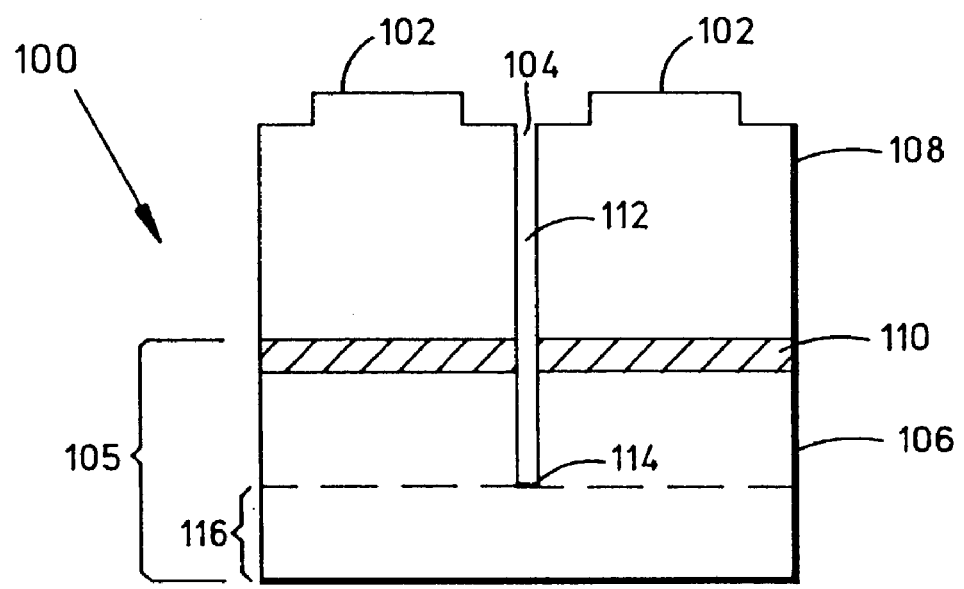
FIG. 2B is a block diagram of a side view of the substrate structure after separation etch has been performed so as to form a groove in the substrate structure.

FIG. 2B is a block diagram of a side view of the substrate structure 100 after the separation etch has been performed. The groove 112 is formed between the components 102 and extends into the substrate 106. A bottom portion 116 of the substrate structure 100 can be removed to a depth sufficient to allow separation of the components 102. Suitable methods for removing the bottom portion 116 of the substrate structure 100 include, but are not limited to, milling, polishing or etching to remove the bottom portion 116 of the substrate 106.

Although the groove 112 is illustrated as being formed between the components 102, the groove 112 can be formed at an edge of the substrate structure 100 as would result when all or a portion of the separation region 104 is located at the edge of the substrate structure 100. When a groove 112 is formed at an edge of the substrate structure 100, a vertical side of the groove 112 is missing.

Figure 2C:
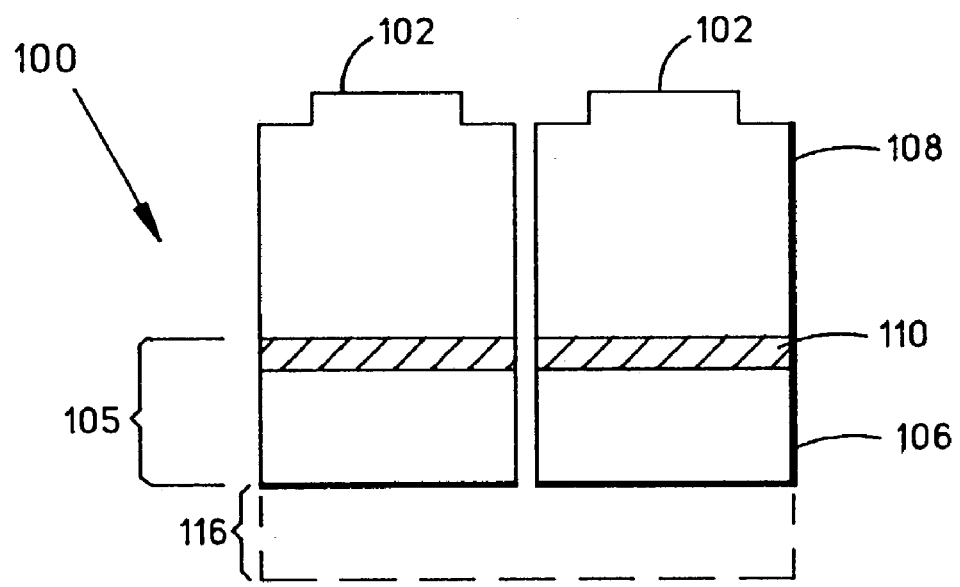
FIG. 2C is block diagram of a side view of the substrate structure after the bottom portion of the substrate is removed.

FIG. 2C is block diagram of a side view of the substrate structure 100 after the bottom portion 112 of the substrate 106 is removed. Removing the bottom of the substrate structure 100 removes enough of the substrate 106 to allow the components 102 to separate and does not necessarily include removing the entire substrate 106 from the bottom 114 of the groove 112 to the bottom of the substrate structure 100. For example, enough substrate 106 material can be removed to allow the components 102 to snap apart when a slight force is applied.

Removing the bottom of the substrate structure 100 can reduce the time for separating the components 102 since the relatively slow separation etch need not form the groove 112 through the entire depth of the substrate structure 100. Those skilled in the art will recognize that various modifications to the exemplary embodiments can be used to separate components 102 in accordance with the teachings herein. For example, one or more etching steps can be used to separate the components 102 without polishing the bottom of the substrate structure 100.

Figure 2D:
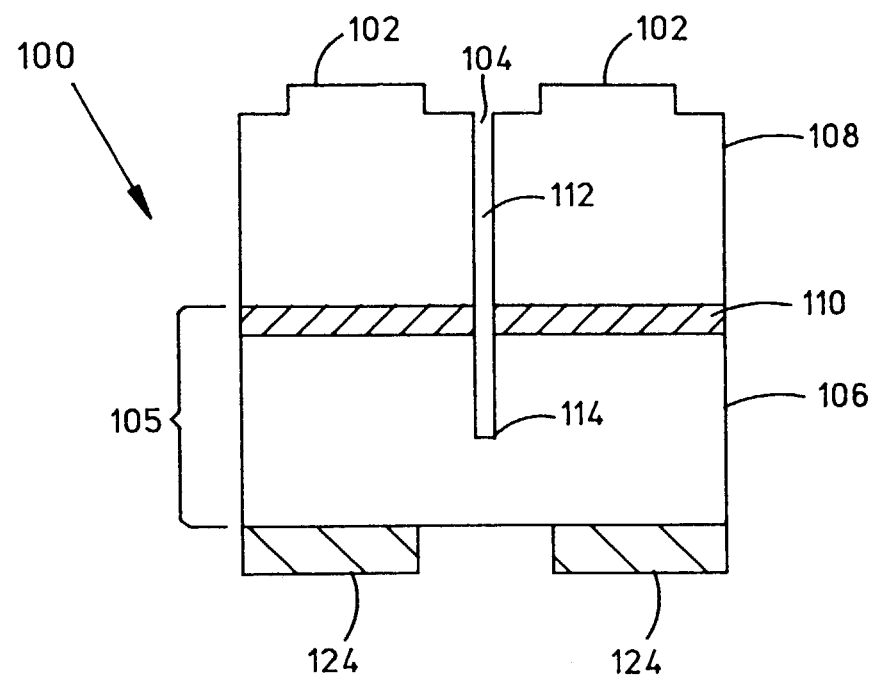
FIG. 2D is block diagram of a side view of the substrate structure after a mask is formed on a bottom of the substrate structure.
Figure 2E:
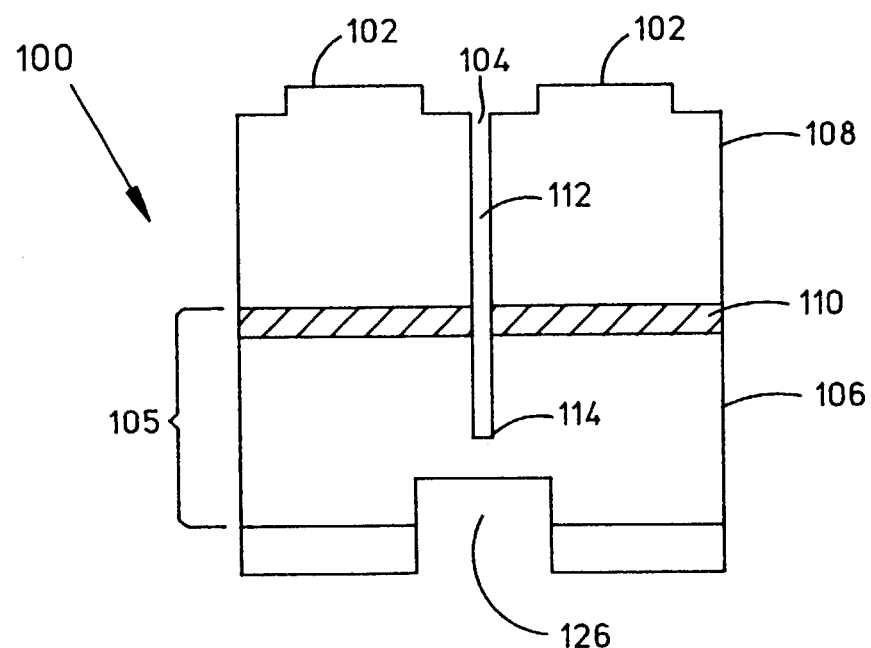
FIG. 2E is block diagram of a side view of the substrate structure after a second groove is formed on the bottom of the substrate structure.

In some instances, the bottom of the substrate structure 100 is selectively removed. For instances, a mask 124 can be formed on the bottom of the substrate so the portion of the substrate structure 100 opposite the groove 112 remains exposed as shown in FIG. 2D. An etch can then be performed so as to form a second groove 126 as shown in FIG. 2E. The second groove 126 can be formed to depth that allows the components 102 to be separated.

Because etching a second groove 126 leaves the bottom of the substrate structure 100 largely intact, the components 102 retain the strength of the original substrate structure 100. For instance, the strength of the substrate 106 can be retained. Additionally, the etch used to form the second groove 126 can employ a different etchant and/or different etchant application conditions than the separation etch. Because the second groove 126 is not through or into the light transmitting medium 108, the etch used to form the second groove 126 will not substantially affect component 102 performance. As a result, the etch used to form the second groove 126 can have a faster etch rate. Additionally, the etch used to form the second groove 126 can result in rougher surfaces than the separation etch.

In some instances, the bottom of the substrate structure 100 is not removed. For instance, the substrate structure 100 can be cut with a laser or other device. The cut is done through the groove 112 so only the base 105 is cut. Because the light transmitting medium 108 is not affected by the cut, the cut does not substantially affect performance of the optical components 102.

Figure 3A:
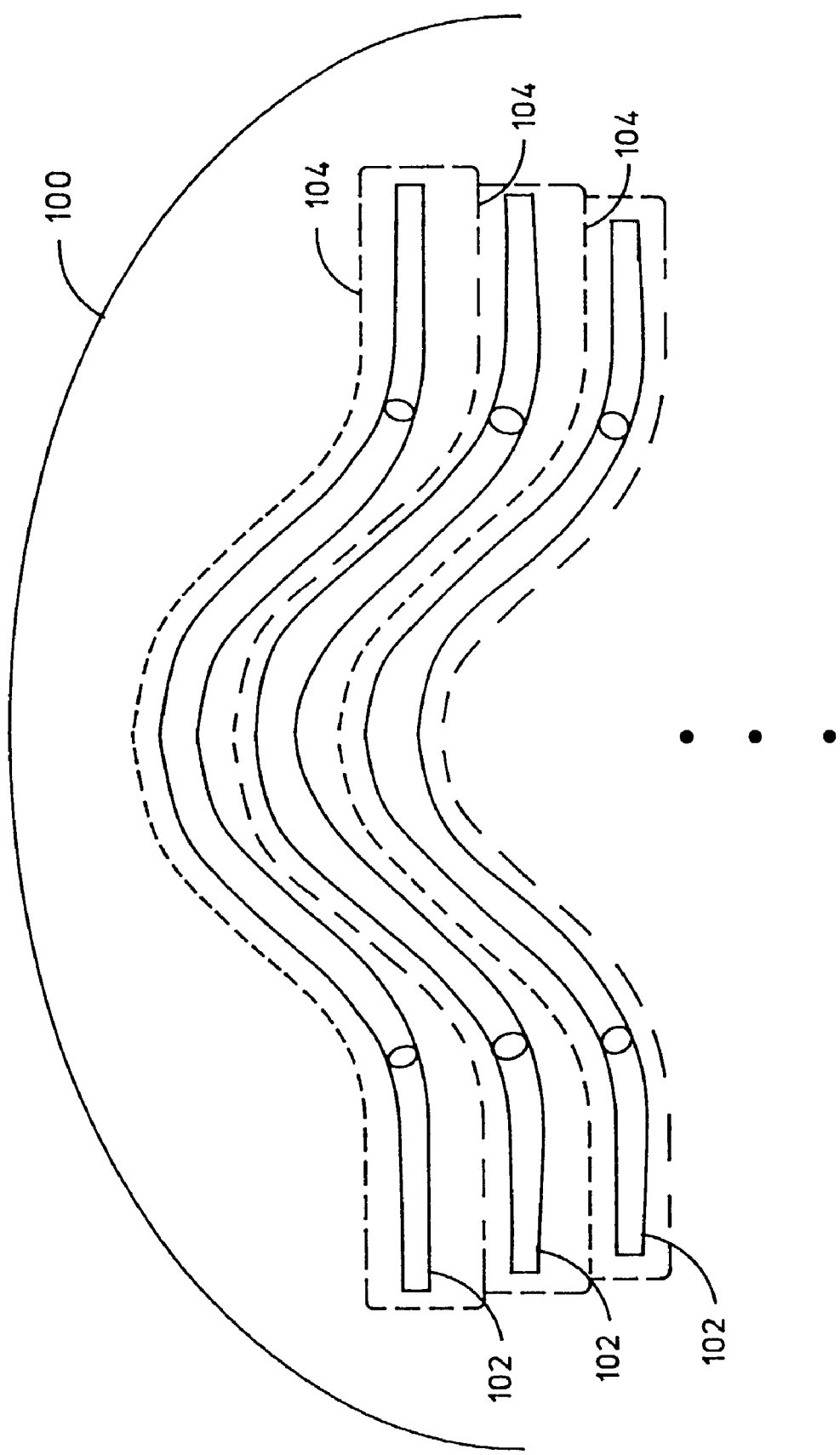
FIG. 3A illustrates the substrate structure with a plurality of components having a curved shape.

FIG. 3A is a topview of a substrate structure 100 having a plurality of optical components to be separated. Examples of optical components include, but are not limited to, attenuators, switches, demultiplexers and wavelength routers. Wavelength routers having a curved shape are illustrated. The curved shape of the wavelength routers allows them to be placed on the substrate structure 100 in a nested configuration. The nested configuration allows the number of wavelength routers on the substrate structure 100 to be maximized. The separation region 104 is shaped such that separating the substrate structure 100 along the separation region 104 results in separation of the waveguide routers 102.

In conventional methods, performance of the optical devices is negatively impacted if the components 102 are spaced too closely. Fissures and fractures caused by conventional separation means such as cutting or milling propagate over time into the optical components 102 requiring an increased space between the optical components 102. Because these fissures, fractures and other stresses do not occur as a result of the separation etch, the present invention allows the components 102 to be placed closer to one another on a substrate structure 100.

Figure 3B:
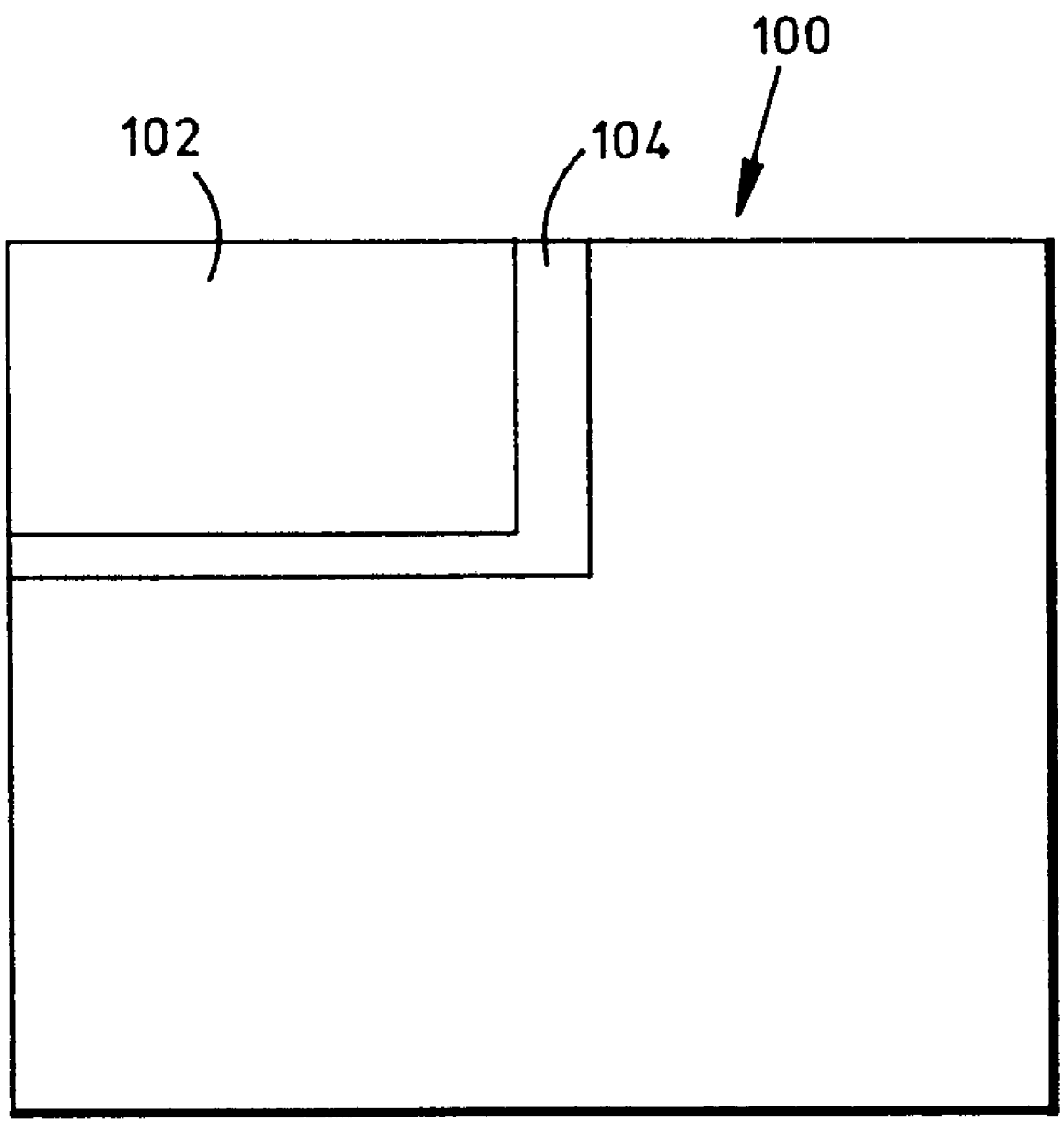
FIG. 3B illustrates the substrate structure with a single component.

The separation etch can also be used to separate a single optical component 102 from the substrate structure 100. For instance, FIG. 3B illustrates a single component 102 formed on a substrate structure 100. The separation region 104 is selected such that separating the substrate structure 100 at the separation region 104 separates the optical component 102 from the substrate structure 100. Although the separation region 104 is shown as being positioned adjacent to two sides of the component 102, the separation region 104 can be positioned adjacent to one side, three sides or four sides of the component 102 and/or can surround the component 102.

As illustrated in FIG. 3A, the separation region 104 can have a curved shape that defines the sides of the component 102 so they are difficult to distinguish or provides the component with more than four sides. Accordingly, the separation region can define at least 25% of the component perimeter, more than 50% of the component perimeter or more than 75% of the component perimeter. Additionally, the separation region 104 can cover an angular range measured from a central location on the component 102. The angular range can be greater than or equal to 90 degrees, 180 degrees, 270 degrees or 360 degrees. For instance, the separation region in the component of FIG. 3B extends over 180 degrees from a central point on the component.

The optical component 102 can include one or more waveguides. The waveguides can end in a facet through which light signals enter and/or exit the optical component 102. One or more of these facets can be formed in part or in whole during the separation etch. FIG. 4A through FIG. 4I illustrate a method of forming a facet during a separation etch. Although various optical components 102 can be formed in accordance with the invention, for illustrative purposes, the formation of waveguide 404 of an optical router is discussed. Those skilled in the art will readily apply the teachings herein to other optical interfaces in addition to waveguides 404 to form a facet 412 in accordance with the invention.

Figure 4A:
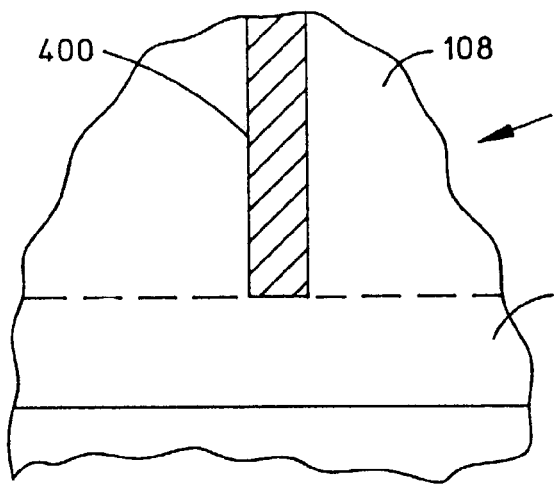
FIG. 4A through FIG. 4I illustrate a method of forming a facet during a separation etch.
Figure 4B:
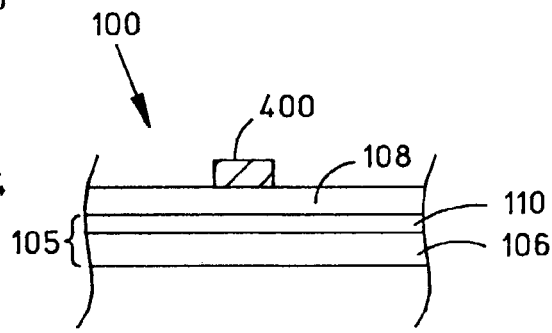

FIG. 4A is a topview of a substrate structure 100 and FIG. 4B is a side view of the substrate structure 100 taken at the dashed line on FIG. 4A. The dashed line denotes the location where the facet 412 is to be formed. The substrate structure 100 includes a light transmitting medium 108 positioned over a base 105 that includes a light barrier 110 and substrate 106. A first mask 400 is formed over the region of the substrate structure 100 where the ridge of a waveguide 404 is to be formed. The separation region 104 and secondary regions located adjacent to the ridge remain exposed. The first mask 400 can also cover other regions of the substrate structure 100 where a ridge is to be formed. For instance, the first mask 400 can also cover the ridge of a star coupler or Rowland circle.

Figure 4C:
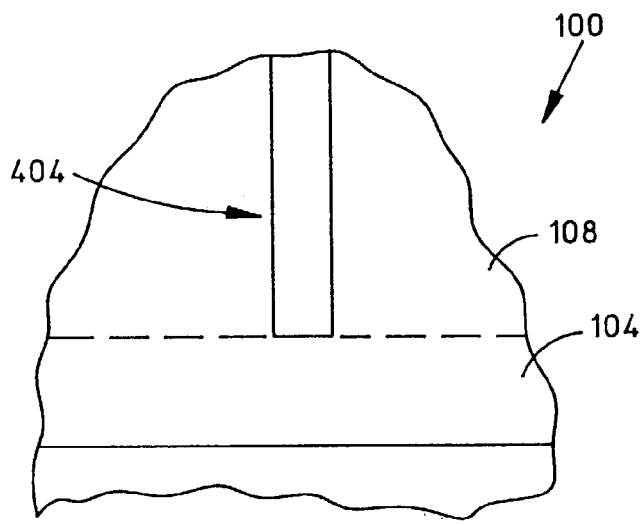
Figure 4D:
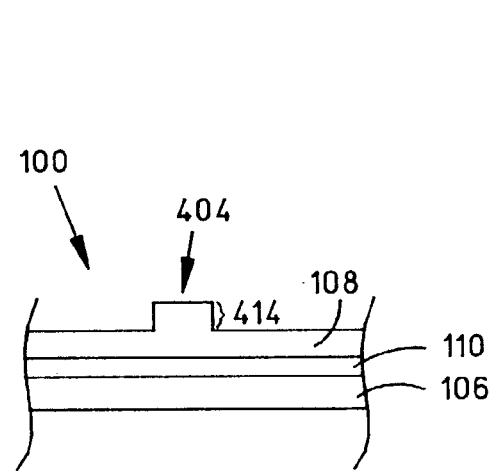

A first etch is performed and the first mask 400 removed to provide the optical substrate structure 100 illustrated in FIG. 4C and FIG. 4D. FIG. 4C is a top view of the substrate structure 100 and FIG. 4D is a cross section of the substrate structure 100 taken at the dashed line in FIG. 4C. The first etch results in formation of sides of a ridge on the substrate structure 100. The first etch also forms an upper region 414 of the facet 412 at the end of the ridge. The first etch can be the same type of etch as the separation etch or can be a different type of etch. Because the sides of the ridge and the upper region 414 of the facet 412 preferably have a high degree of smoothness, the first etch preferably provides smooth vertical surfaces. A suitable first etch includes, but is not limited to, a reactive ion etch, an etch according to the Bosch process or an etch in accordance with patent application Ser. No. 09/690,959 referenced above. Because the separation region 104 remains exposed during the first etch, a portion of the separation regions 104 is removed during the first etch.

Figure 4E:
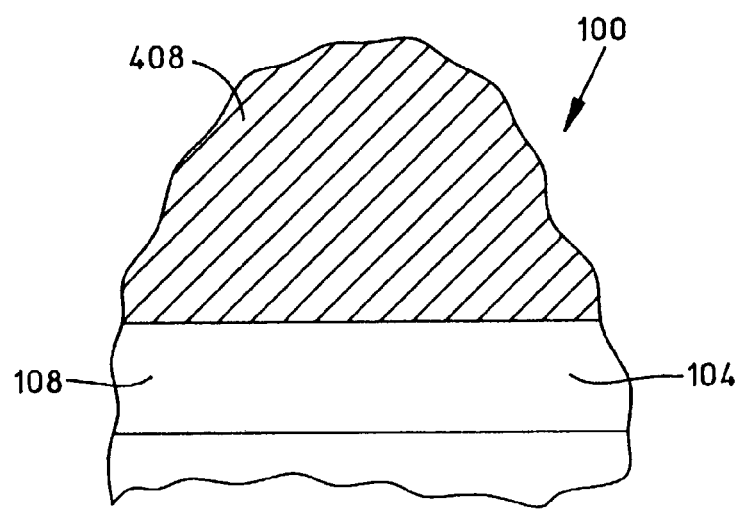

A second mask 408 is formed on the substrate structure 100 to provide the substrate structure 100 illustrated in FIG. 4E. FIG. 4E is topview of the substrate structure 100. The second mask 408 is aligned with the upper region 414 of the facet 412. The ridge and the secondary regions are protected while the separation region 104 remains exposed.

Figure 4F:
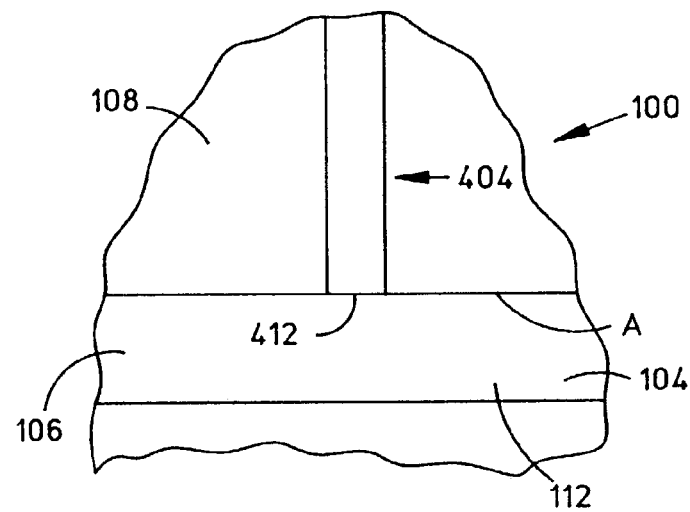
Figure 4G:
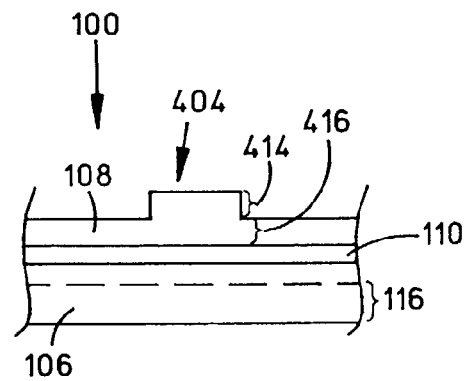

A second etch is performed and the second mask 408 removed so as to provide the substrate structure 100 shown in FIG. 4F and FIG. 4G. FIG. 4F is a topview of the substrate structure 100 and FIG. 4G is a cross section of the substrate structure 100 taken at the line labeled A in FIG. 4F. For the purposes of illustration, the depth of the separation etch is illustrated by the dashed line in FIG. 4G. The second etch forms a lower region 416 of the facet 412 at the end of the ridge. The second etch employs the same etchant and etchant application conditions as the separation etch and is performed to the depth of the separation etch. As a result, the second mask can be the mask 200 discussed with respect to FIG. 2A.

Figure 4H:
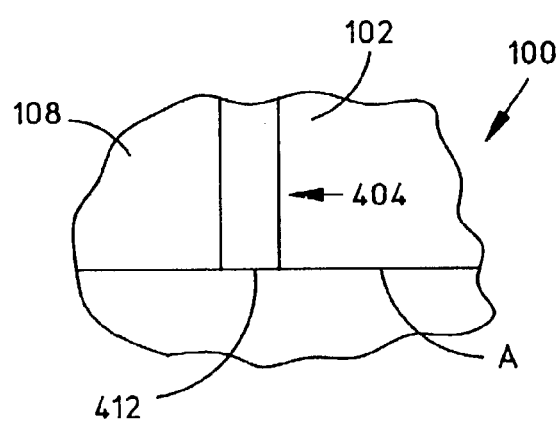
Figure 4I:
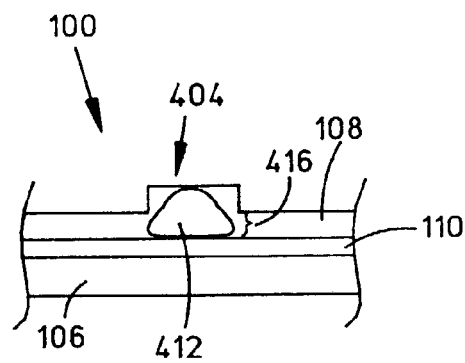

The base 105 can be removed from the bottom side of the substrate structure 100 to provide the substrate structure 100 shown in FIG. 4H and FIG. 4I. FIG. 4H is a topview of the substrate structure 100 and FIG. 4I is a cross section of the substrate structure 100 taken at the line labeled A in FIG. 4H. In some instances, the base 105 is removed to the depth of the separation etch. Alternatively, a smaller amount of the base 105 or none of the base 105 can be removed and the remaining portion of the base 105 can be cracked, cleaved or cut. As noted above, suitable methods for removing the base 105 include, but are not limited to polishing, milling or etching the bottom of the substrate structure 100. Further, the substrate 106 can be selectively removed by forming a second groove 126 into the base 105 opposite the groove 112 formed by the separation etch. Finally, the substrate structure 100 can be cut through the groove 112 formed by the separation etch.

The ridge defines a portion of a light signal carrying region of a waveguide 404. The light barrier 110 is constructed to reflect light signals from the light signal carrying region back into the light signal carrying region. As a result, the light barrier 110 also defines a portion of the light signal carrying region. The profile of a light signal is illustrated by the line labeled A in FIG. 4I.

Figure 5A:
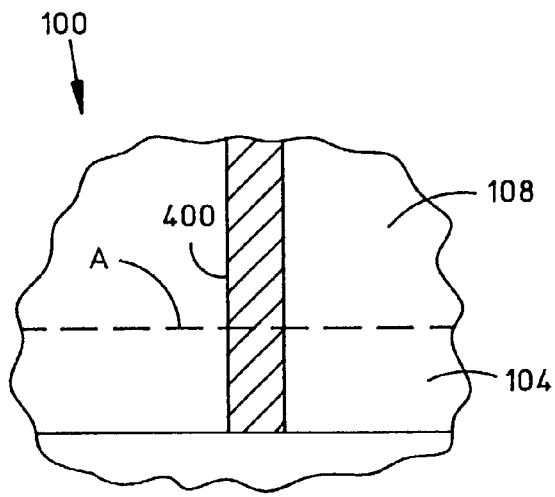
FIG. 5A through FIG. 5J illustrate an embodiment of a method of forming a facet during a separation etch. The illustrated method does not require alignment of subsequently formed masks.
Figure 5B:
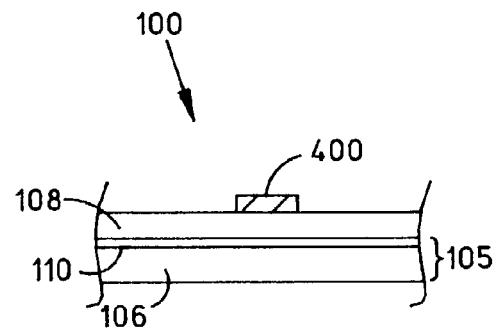

FIG. 5A through FIG. 5J illustrate another method of forming a facet 412 during a separation etch. The method illustrated in FIG. 5A through FIG. 5J does not require alignment of subsequently formed masks. FIG. 5A is a topview of a substrate structure 100 and FIG. 5B is a side view of the substrate structure 100 taken at the dashed line on FIG. 5A. The dashed line denotes the location where the facet 412 is to be formed. The substrate structure 100 includes a light transmitting medium 108 positioned over a base 105 that includes a light barrier 110 and substrate 106. A first mask 400 is formed over the region of the substrate structure 100 where the ridge of a waveguide 404 is to be formed. In contrast to FIG. 4A, the waveguide is formed past the location where the facet is to be formed. The separation region 104 and secondary regions located adjacent to the ridge remain exposed. The first mask 400 can also cover other regions of the component where a ridge is to be formed. For instance, the first mask 400 can also cover the ridge of a star coupler or Rowland circle.

Figure 5C:
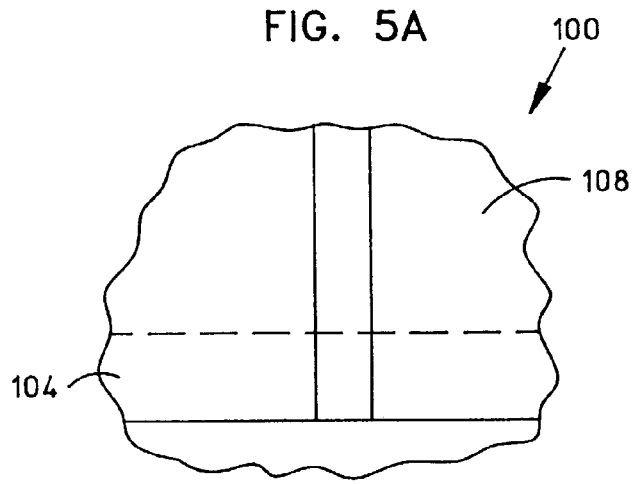
Figure 5D:
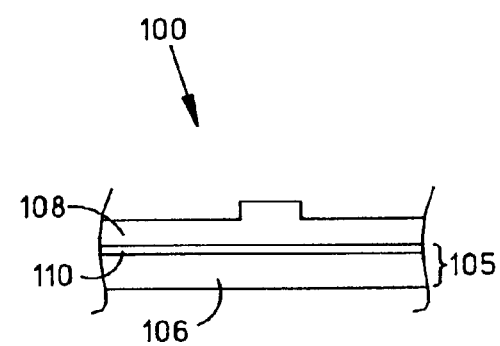

A first etch is performed and the first mask 400 removed to provide the substrate structure 100 illustrated in FIG. 5C and FIG. 5D. FIG. 5C is a top view of the substrate structure 100 and FIG. 5D is a cross section of the substrate structure 100 taken at the dashed line in FIG. 5C. The first etch results in formation of sides of a ridge on the substrate structure 100. The first etch can be the same type of etch as the separation etch or can be a different type of etch. Because the sides of the ridge and the upper region 414 of the facet 412 preferably have a high degree of smoothness, the first etch preferably provides smooth vertical surfaces. A suitable first etch includes, but is not limited to, a reactive ion etch, an etch according to the Bosch process or an etch in accordance with patent application Ser. No. 09/690,959, referenced above. Because the separation region 104 can remain exposed during the first etch, a portion of the separation regions 104 can be removed during the first etch.

Figure 5E:
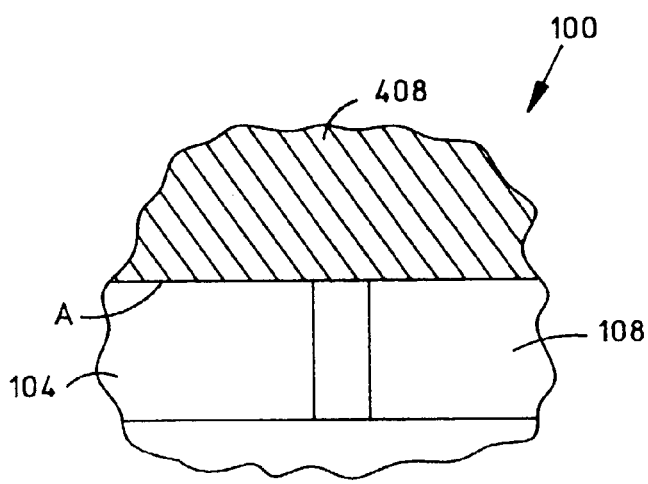
Figure 5F:
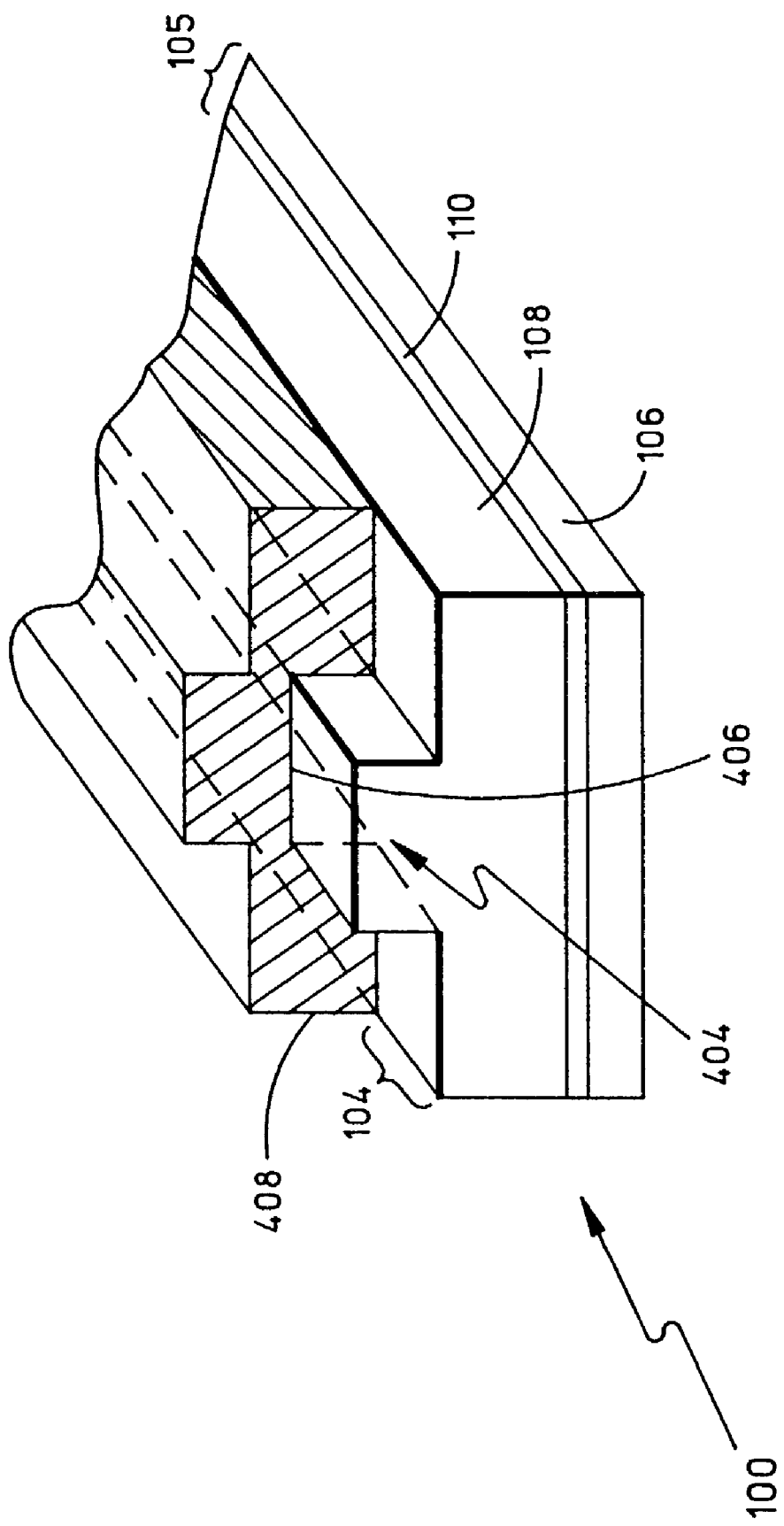

A second mask 408 is formed on the substrate structure 100 to provide the substrate structure 100 illustrated in FIG. 5E and FIG. 5F. FIG. 5E is topview of the substrate structure 100 and FIG. 5F is a perspective view of the substrate structure 100. The second mask 408 is aligned with the location where the facet 412 is to be formed. The ridge and the secondary regions are protected while the separation region 104 remains exposed.

Figure 5G:
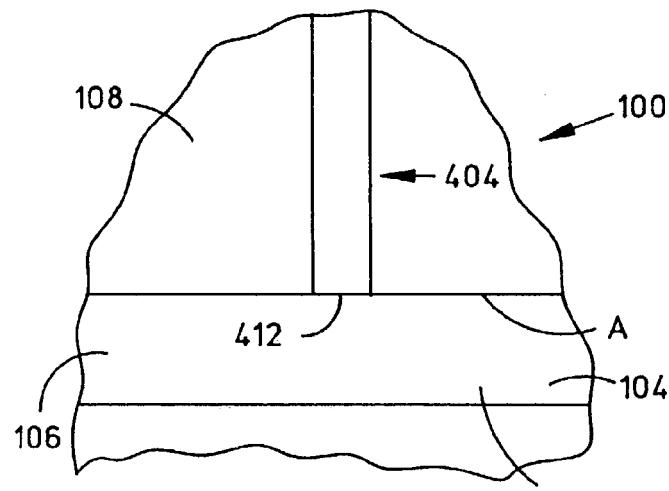
Figure 5H:
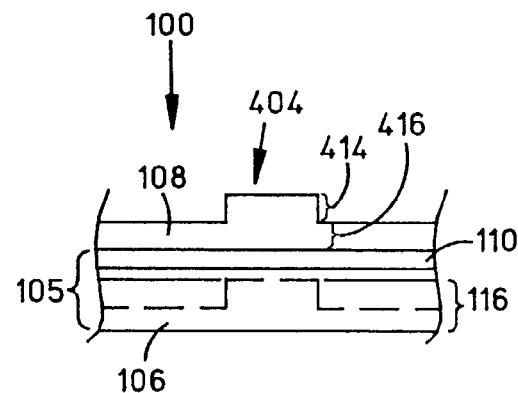

A second etch is performed and the second mask 408 removed so as to provide the substrate structure 100 shown in FIG. 5G and FIG. 5H. FIG. 5G is a topview of the substrate structure 100 and FIG. 5H is a cross section of the substrate structure 100 taken at the line labeled A in FIG. 5G. For the purposes of illustration, the depth of the separation etch is illustrated by the dashed line in FIG. 5H. The second etch step and the separation etch are the same step. As a result, the second mask 408 can be the mask 200 discussed with respect to FIG. 2A. The second etch forms the entire facet 412. Accordingly, there is no need to achieve precise alignment of subsequently formed masks.

Figure 5I:
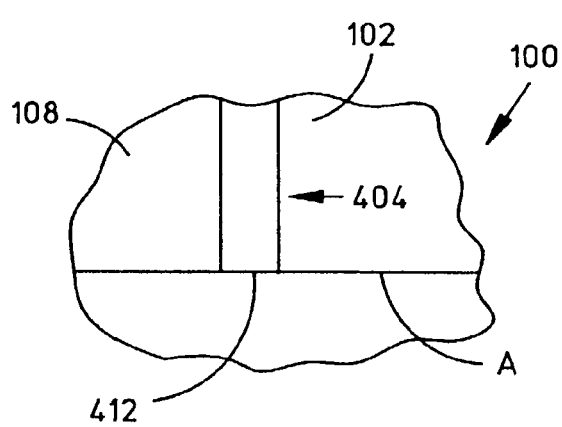
Figure 5J:
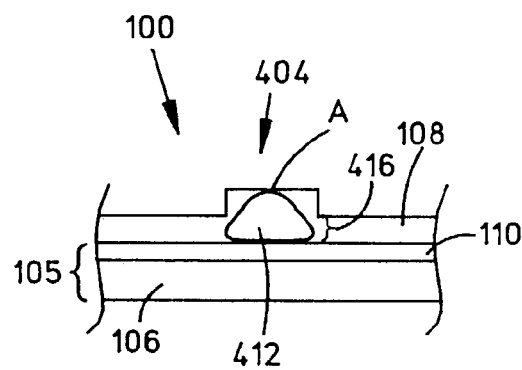

The base can be removed from the bottom of the substrate structure 100 to provide the substrate structure 100 shown in FIG. 5I and FIG. 5J. FIG. 5I is a topview of the substrate structure 100 and FIG. 5J is a cross section of the substrate structure 100 taken at the line labeled A in FIG. 5I. In some instances the base 105 is removed to the depth of the separation etch. Alternatively, a smaller amount of the base 105 or none of the base 105 can be removed and the remaining portion of the base 105 can be cracked, cleaved or cut. As noted above, suitable methods for removing the base 10S include, but are not limited to polishing, milling or etching the bottom of the substrate structure 100. Further, the substrate 106 can be selectively removed by forming a second groove 126 into the base 105 opposite the groove 112 formed by the separation etch. Finally, the substrate structure 100 can be cut through the groove 112 formed by the separation etch.

The ridge defines a portion of a light signal carrying region of a waveguide 404. The light barrier 110 is constructed to reflect light signals from the light signal carrying region back into the light signal carrying region. As a result, the light barrier 110 also defines a portion of the light signal carrying region. The profile of a light signal is illustrated by the line labeled A in FIG. 5J.

Figure 6A:
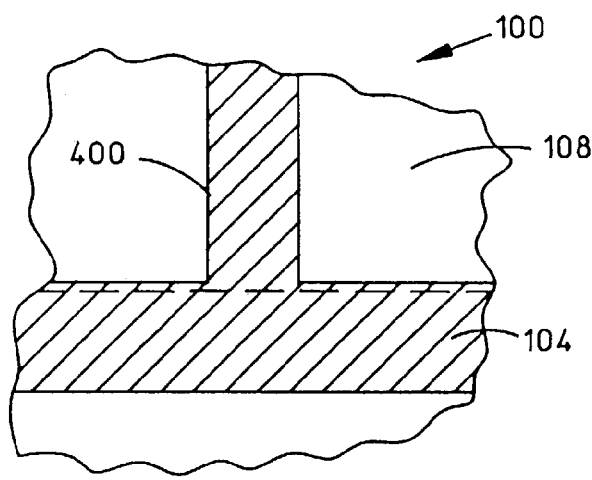
FIG. 6A through FIG. 6J illustrate another embodiment of a method for forming a facet during a separation etch. The illustrated method does not require alignment of subsequently formed masks.
Figure 6B:
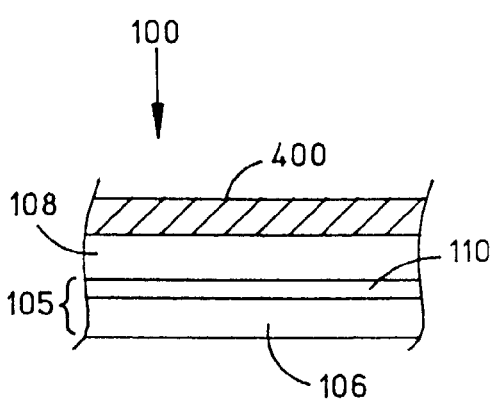

FIG. 6A through FIG. 6J illustrate another embodiment of forming a facet of a waveguide during the separation etch. The illustrated method does not require alignment of subsequently formed masks. FIG. 6A is a top view of a substrate structure 100 and FIG. 6B is a sideview of the substrate structure 100 taken at the dashed line shown in FIG. 6A. A first mask 400 is formed so the regions of the substrate structure 100 where the ridge of a waveguide 404 is protected. The first mask 400 also extends over the section of the substrate structure 100.

Figure 6C:
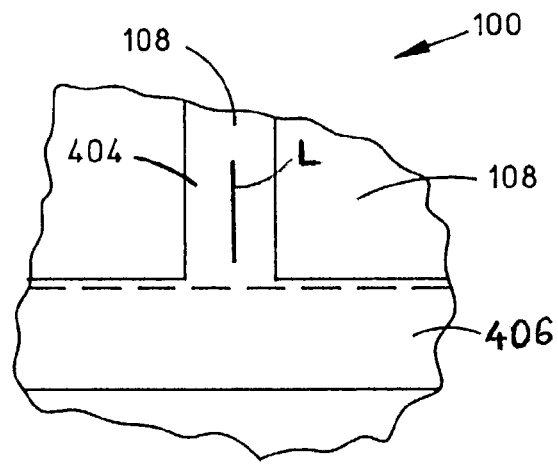
Figure 6D:
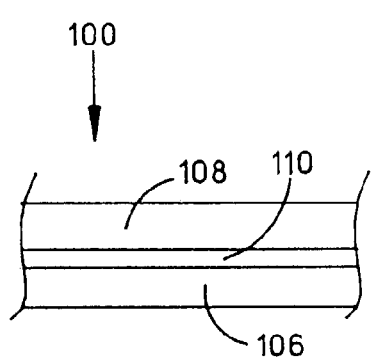

A first etch is performed and the first mask 400 removed to provide the substrate structure 100 illustrated in FIG. 6C and FIG. 6D. FIG. 6C is a top view of the substrate structure 100 and FIG. 6D is a cross section of the substrate structure 100 taken at the dashed line in FIG. 6C. The first etch forms a ridge that includes a waveguide 404 and a flange region 406 that extends across the longitudinal axis of the waveguide labeled L. The first etch can be the same type of etch as the separation etch or can be a different etch. Because the sides of the ridge preferably have a high degree of smoothness, the first etch preferably provides smooth vertical surfaces. A suitable first etch includes, but is not limited to, a reactive ion etch, an etch according to the Bosch process or an etch in accordance with patent application Ser. No. 09/690,959 referenced above.

Figure 6E:
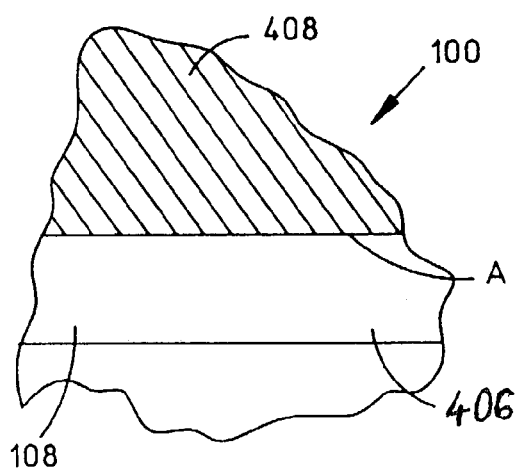
Figure 6F:
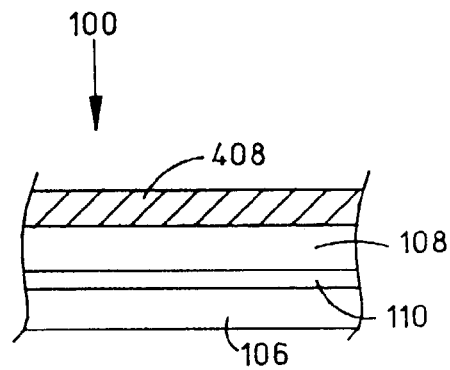

A second mask 408 is formed on the substrate structure 100 to provide the substrate structure 100 illustrated in FIG. 6E and FIG. 6F. FIG. 6E is topview of the substrate structure 100 and FIG. 6F is a cross section of the substrate structure 100 taken at the line labeled A. The second mask 408 is formed such that the waveguide 404 is protected. The second mask 408 protects a portion of the flange region 406 section of the substrate structure 100.

Figure 6G:
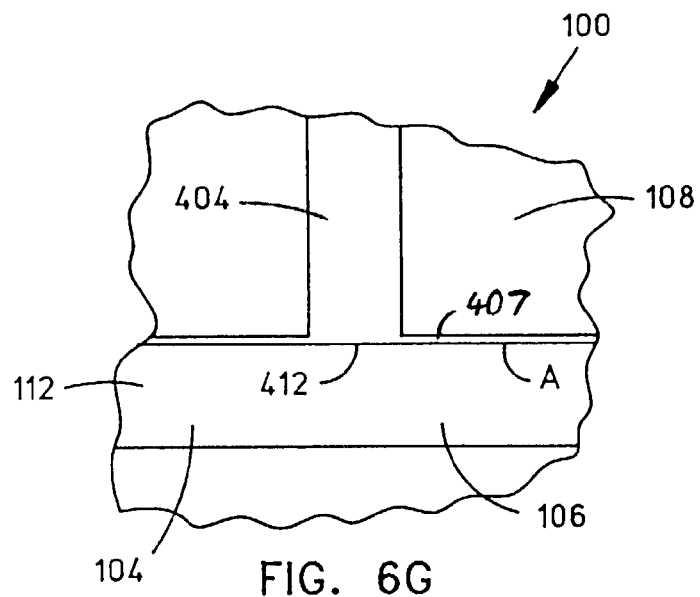
Figure 6H:
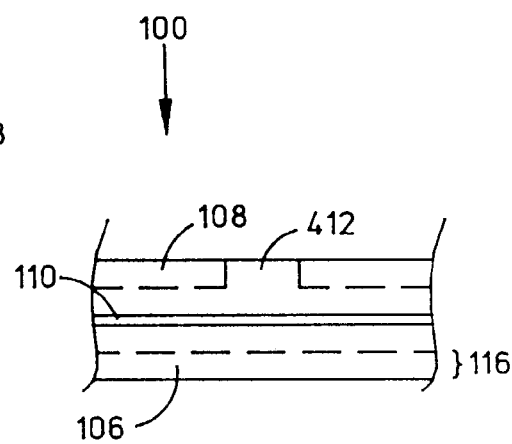

A second etch is performed and the second mask 408 removed so as to provide the substrate structure 100 shown in FIG. 6G and FIG. 6H. FIG. 6G is a topview of the substrate structure 100 and FIG. 6H is a cross section of the substrate structure 100 taken at the line labeled A in FIG. 6G. For the purposes of illustration, the depth of the separation etch is illustrated by the dashed line in FIG. 6H. The second etch forms the entire facet 412. As a result, there is no need to align subsequently formed masks. The second etch step and the separation etch are the same step. As a result, the second mask can be the mask 200 discussed with respect to FIG. 2A.

A flange 407 extends outward from the waveguide 404 as illustrated by FIG. 6G and FIG. 6H. The flange is a result of the second mask 408 protecting a portion of the flange region 406. Reducing the amount of the flange region 406 that is protected can reduce the thickness of the flange. Additionally, achieving alignment between the second mask 408 and the flange region 406 can eliminate the flange 407.

Figure 6I:
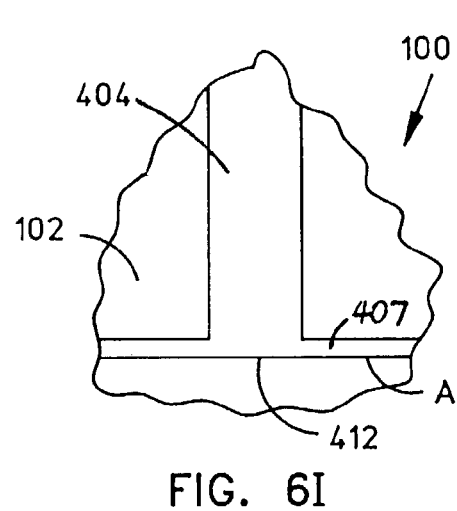
Figure 6J:
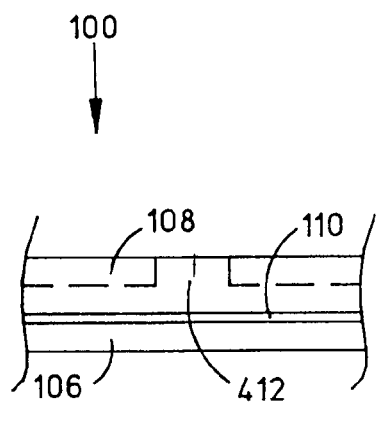

The substrate 106 can be removed from the substrate 106 side of the substrate structure 100 to provide the substrate structure 100 shown in FIG. 6I and FIG. 6J. FIG. 6I is a topview of the substrate structure 100 and FIG. 6J is a cross section of the substrate structure 100 taken at the line labeled A in FIG. 6I. The substrate 106 can be removed to the depth of the separation etch. Alternatively, a smaller amount of the substrate 106 or none of the substrate 106 can be removed and the remaining portion of the substrate 106 can be cracked, cleaved or cut. As noted above, suitable methods for removing the substrate 106 include, but are not limited to polishing, milling or etching the entire substrate 106 side of the substrate structure 100. Further, the substrate 106 can be selectively removed by forming a second groove 126 into the substrate 106 opposite the groove 112 formed by the separation etch. Finally, the substrate structure 100 can be cut through the groove 112 formed by the separation etch.

Figure 7A:
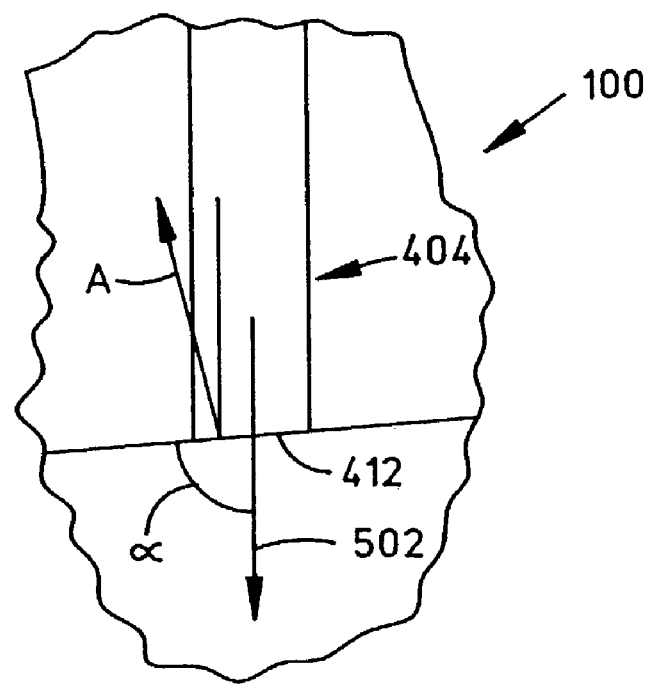
FIG. 7A is a block diagram illustrating a top view of a substrate structure having waveguide with a facet. The facet is formed at an angle less than ninety degrees relative to the direction of propagation of light signals traveling along the waveguide.

The components can include facets that are substantially perpendicular to the base but are angled at less than ninety degrees relative to a direction of propagation of light signals along the waveguide. For instance, FIG. 7A is a topview of a waveguide having a facet with an angle α that is less than ninety degrees relative to the direction of propagation 502 of light signals along the waveguide. The angled facet 412 can cause a light signal that is reflected off the facet 412 from within the waveguide 404 to be reflected out of the waveguide as illustrated by the arrow labeled A. Reflecting these light signals out of the waveguide 404 can prevent them from resonating in the waveguide 404.

The return losses can increase as the facet angle α is decreased. Accordingly, there can be a tradeoff of a desired increase in return loss and the undesired increase in insertion loss. Although the facet angle α may range anywhere from a few degrees to tens of degrees, the most desirable performance will be achieved with an angle of 70 to 90 degrees, 80 to 88 degrees 80 to 85 degrees or 82 to 84 degrees. The facet angle α is substantially equal to 83 degrees in some instances. Those skilled in the art will readily apply the teachings herein to choose a facet angle α to obtain the desired results without undue experimentation.

Figure 7B:
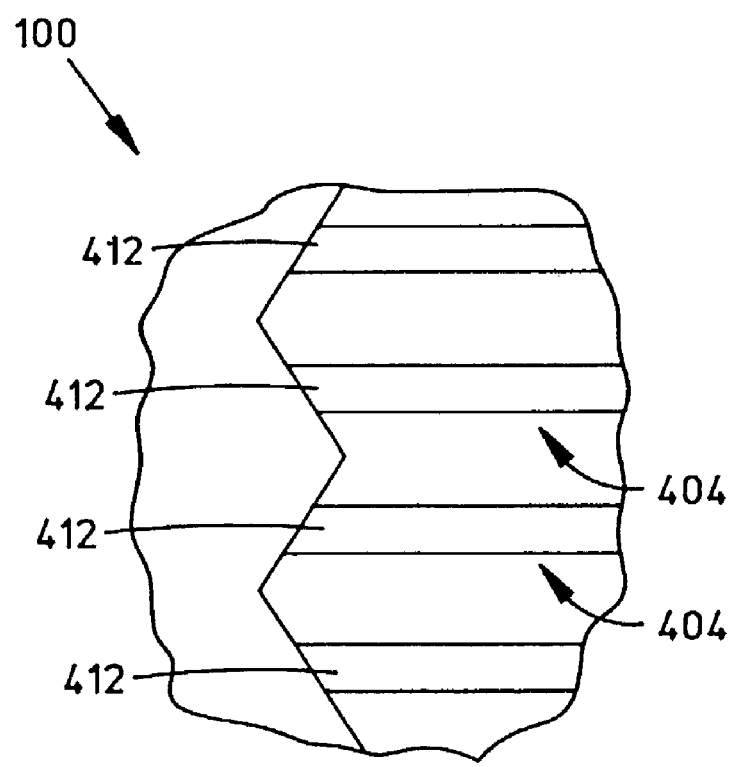
FIG. 7B illustrate a component having a plurality of waveguides that each end in a facet angled at less than ninety degrees relative to the direction of propagation of light signals traveling along the waveguide.

FIG. 7B is a topview of an optical component 102 having a plurality of waveguide 404. Each waveguide 404 ends in a facet 412. The direction of the facet angle on adjacent waveguides 404 is alternated so as to provide a zig zag configuration of facets 412 at the edge of the component 102. The component 102 can also be constructed so the facet 412 direction is alternated less frequently than every facet 412.

The methods discussed with respect to FIG. 4A through FIG. 6J can be adapted to formation of optical components having angled facets. For instance, the mask(s) can be formed with an edge positioned at less than ninety degrees relative to the direction of propagation of light signal along the waveguide.

Figure 8:
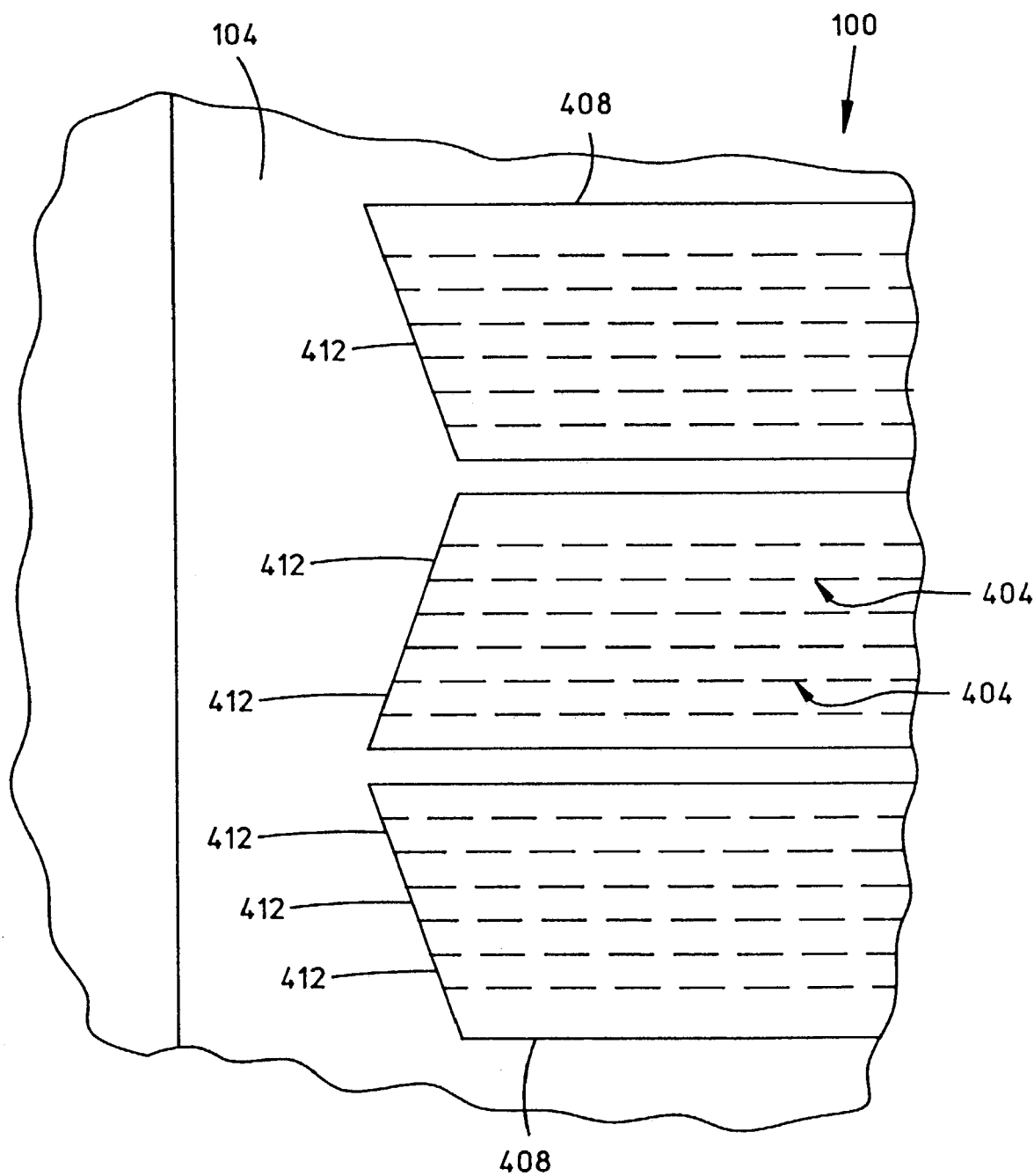
FIG. 8 is a block diagram illustrating a top view of the substrate structure with a mask positioned at the intended location of facets for a plurality of optical components.

FIG. 8 illustrate FIG. 5E and FIG. 5F adapted to formation of waveguides 404 with facets angled at less than ninety degrees relative to the direction of propagation of light signals traveling along the waveguides 404. FIG. 8 is a top view of a substrate structure 100 including a plurality of optical components 102. Each optical component includes more than one waveguide 404. The second mask of FIG. 5E and FIG. 5F is positioned such that the separation region 104 remains exposed. The location of the waveguides 404 under the mask is illustrated as dashed lines.

The mask of FIG. 8 includes an edge positioned at the intended location of the facets 412. The mask is angled at less than ninety degrees relative to the direction of propagation of light signals along the waveguides. The angled facets will be formed as a result of performing the second etch with the mask in place.

The facets 412 that result from the separation etch on each component 102 of FIG. 8 will be angled in the same direction although the direction of the facets 412 on adjacent components 102 is alternated. Alternatively, the direction of the facets 412 on an optical component 102 can be alternated as discussed with respect to FIG. 7B. Further, components having angled facets can be combined with components having facets that are substantially perpendicular to the direction of propagation. Additionally, a single component can have angled facets and facets that are substantially perpendicular to the direction of propagation.

Figure 9:
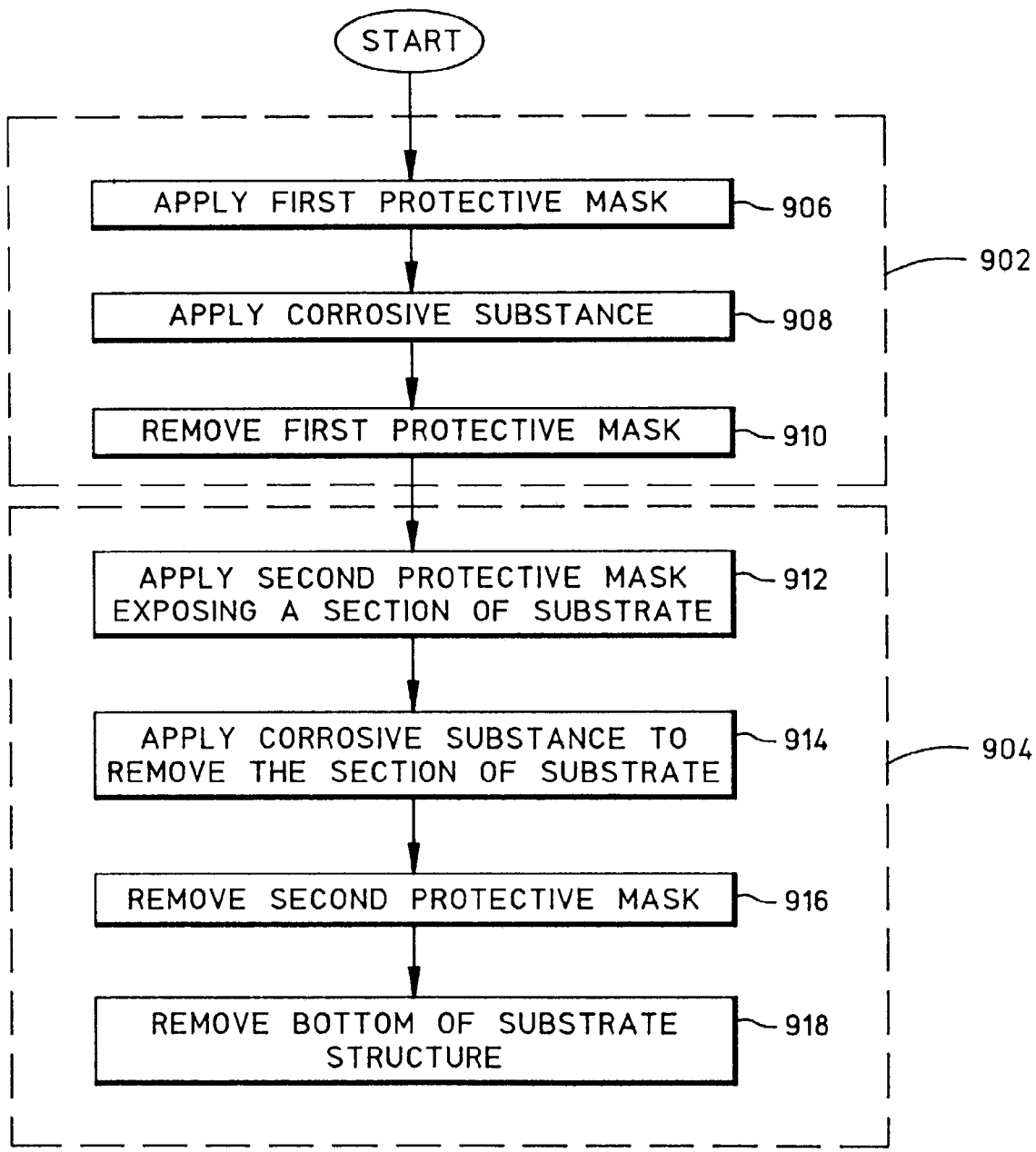
FIG. 9 is flow chart of method of forming a component in a substrate structure.

FIG. 9 is flow chart of method of separating components 102 formed on a substrate 106. At step 902, a plurality of components 102 is at least partially formed by etching. At step 904, the plurality of components 102 are separated by etching. A first etch is performed to produce the optical components 102 and a second etch is performed to separate the components 102. Although any one of several etching techniques may be used for the etch and the second etch, suitable techniques include reactive ion etches, etches according to the Bosch process and etches in accordance with patent application Ser. No. 09/690,959. As discussed in further detail below, a facet 412 can be formed during the separation etch.

In the exemplary embodiment, step 902 comprises steps 906-910. At step 906, a first mask 400 is applied to the substrate structure 100 to protect the areas not to be etched. The first mask first mask 400 is applied in accordance with known techniques.

At step 908, a corrosive substance is applied to the substrate structure 100 in a first etch. The plurality of components 102 are at least partially formed as the etching process removes the selected portions of substrate 106 material. For instance, waveguides 404 can be at least partially formed during the first etch. Additionally, a region of a facet 412 can be formed during the first etch. Further, a portion of the separation region 104 can also be removed during the first etch.

At step 910, the first mask first mask 400 is removed. Any one of suitable known techniques may be used to remove the mask such as washing the substrate structure 100 in a solution to dissolve the first mask first mask 400.

Step 904 comprises steps 912 through 916 in the exemplary embodiment although a variety of techniques may be used to perform the second etch of step 904. At step 912, a second mask 408 is applied to the substrate structure 100 exposing a separation region 104 of the substrate structure 100 between the plurality of components 102. The separation region 104 of the substrate structure 100 may have a variety of shapes and may have straight of curved lines. Further, the separation region 104 of the substrate structure 100 may completely surround a component 102.

At step 914, a corrosive substance is applied in a second etch. The second etch removes at least a portion of the separation region 104 of the substrate structure 100. The separation region 104 of the substrate structure 100 is removed sufficiently to allow the plurality of components 102 to be separated when the bottom of the substrate structure 100 polished.

At step 916, the second mask 408 is removed. Known techniques can be used to dissolve the second mask 408.

The bottom of the substrate structure 100 can be removed in step 918. For instance, the substrate 106 can removed from the bottom of the substrate structure 100 by polishing, milling, grinding, etching or any other method suitable for efficiently removing the substrate 106. The substrate 106 is polished or milled to a point sufficiently near the bottom 114 of the groove 112 to separate the components 102. In view of the methods described above, optical components 102 can be separated concurrently with the formation of facets 412 on one or more waveguides 404.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of forming an optical component on a substrate structure, comprising:
    forming a ridge in a light transmitting medium positioned on a base, the ridge including a waveguide region configured to propagate light signals and a flange region extending across a longitudinal axis of the waveguide region; and
    removing at least a portion of the flange region while a mask protects a top of the waveguide region of the ridge but does not protect at least a portion of a top of the flange region of the ridge, the portion of the flange region being removed so as to expose a facet aligned with the waveguide region such that light signals propagated along the waveguide region are transmitted through the facet, the portion of the flange region being removed after the ridge is formed.

2. The method of claim 1, wherein at least a portion of the substrate structure is positioned between the facet and an edge of the substrate structure.

3. The method of claim 1, further comprising:
    forming the before removing the portion of the flange region and after forming the ridge.

4. The method of claim 3, wherein removing the portion of the flange region includes etching the substrate structure after forming the mask.

5. The method of claim 4, wherein the entire facet is exposed during the etch.

6. The method of claim 1, wherein the facet is formed such that an angle between the facet and the direction of propagation is 82 to 84 degrees.

7. The method of claim 1, wherein removing at least a portion of the flange region includes removing only a portion of the flange region such that another portion of the flange region remains intact on the optical component.

8. The method of claim 1, wherein the mask protects only a portion of the flange region.

9. The method of claim 1, wherein forming the ridge includes forming a second mask so as to protect a region of the optical component where the ridge is to be formed, the mask being different from the second mask.

10. The method of claim 9, further comprising:
    etching the optical component with the second mask in place on the optical component so as to form the ridge on the optical component.

11. The method of claim 10, further comprising:
    removing the second mask before forming the mask.

12. The method of claim 1, wherein the light transmitting medium is in the ridge when the ridge is formed and material in the removed portion of the flange region has a chemical composition that is the same as a chemical composition of the light transmitting medium in the ridge when the ridge is formed.

13. The method of claim 1, further comprising:
    forming a second mask so as to protect a region of the optical component where the ridge is to be formed before forming the ridge;
    removing the second mask before removing the portion of the flange region; and
    forming the mask on the optical component before removing the portion of the flange region and after removing the second mask.

14. The method of claim 1, further comprising:
    forming a second mask so as to protect a region of the optical component where the ridge is to be formed before forming the ridge;
    removing the second mask before removing the portion of the flange region;
    forming the mask on the optical component before removing the portion of the flange region and after removing the second mask; and
    wherein removing the portion of the flange region includes etching the portion of the flange region such that the entire facet is exposed during the etch.

15. The method of claim 1, further comprising:
    forming a second mask so as to protect a region of the optical component where the ridge is to be formed before forming the ridge;
    removing the second mask before removing the portion of the flange region;
    forming the mask on the optical component before removing the portion of the flange region and after removing the second mask; and
    wherein the light transmitting medium is in the ridge when the ridge is formed and material in the removed portion of the flange region has a chemical composition that is the same as a chemical composition of the light transmitting medium in the ridge when the ridge is formed.

16. The method of claim 1, further comprising:

forming a second mask so as to protect a region of the optical component where the ridge is to be formed before forming the ridge;

removing the second mask before removing the portion of the flange region;

forming the mask on the optical component before removing the portion of the flange region and after removing the second mask;

wherein removing the portion of the flange region includes etching the portion of the flange region such that the entire facet is exposed during the etch; and wherein the light transmitting medium is in the ridge when the ridge is formed and material in the removed portion of the flange region has a chemical composition that is the same as a chemical composition of the light transmitting medium in the ridge when the ridge is formed.

* * * * *